April 24, 1951 J. A. MORRISON ET AL 2,550,018
QUICK-ACTING TENSIONING CONNECTOR
Filed May 28, 1946
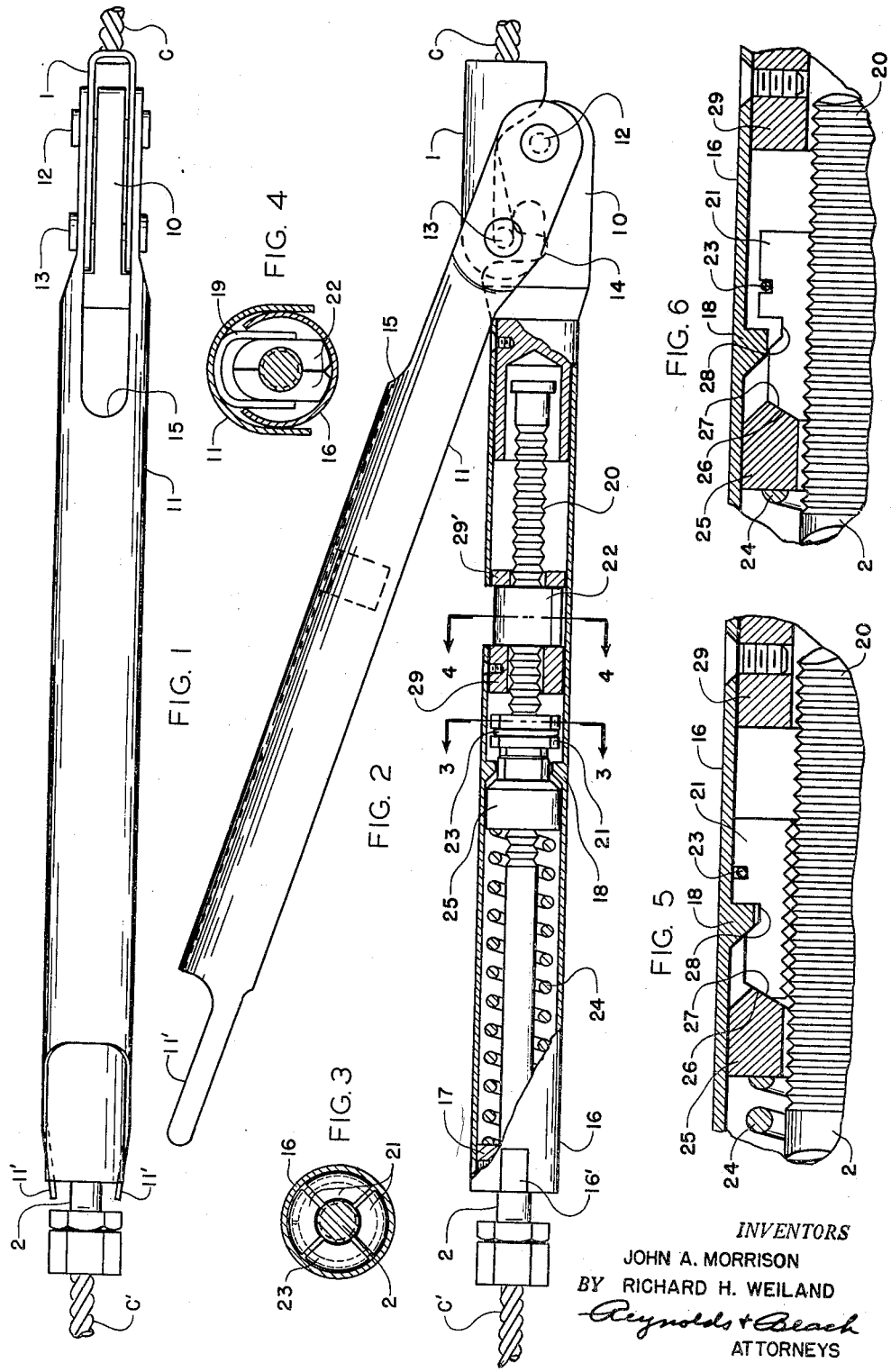
INVENTORS
JOHN A. MORRISON
RICHARD H. WEILAND
BY Reynolds + Beach
ATTORNEYS Patented Apr. 24, 1951

2,550,018

UNITED STATES PATENT OFFICE 2,550,018

QUICK-ACTING TENSIONING CONNECTOR

John A. Morrison and Richard H. Weiland, Seattle, Wash., assignors to Boeing Airplane Company, a corporation of Delaware Application May 28, 1946, Serial No. 672,822

13 Claims. (Cl. 24—71)

This invention concerns a quick-acting connector for the ends of tension members, such as ropes, wires, chains, cables, etc., which, during the connecting operation, will create the desired stress in the tension member, provided that such member does not have excessive slack in it. On the contrary, if the stress would be greater than desired, the connector can not be secured. A typical application of the connector is for securing together the ends of control cables in an airplane. Consequently it shall be referred to hereafter as a cable connector, it being understood that the word "cable" is purely representative.

The principal object of the invention is to combine the operation of effecting a cable joint and of producing the desired stress automatically by adjusting the length of the cable slightly during the connecting operation to the degree necessary. Such a connector may be engaged and disengaged quickly, and, when disengaged, completely severs all connection between the cable parts to be joined.

A further object is to provide a device capable of accomplishing the aforementioned purpose, and which, in addition, will be locked to effect an unyielding connection at the completion of the coupling operation, so that after the initial tension has once been established, which may be termed the "rigging load," variation in tension of the cable will not alter the adjustment of the coupling mechanism.

It is also an object to enable the initial value of the cable tension produced by the connector to be selected by a simple adjustment or alteration of the connector structure.

Upon release of the connector its parts may readily be returned to their relationship existing prior to the connecting operation, so that, when next manipulated for connecting the cable parts, the tensioning operation will not be influenced by any relationship assumed by parts of the connector during a preceding tensioning operation.

A particular object is to enable a quickly engageable and releasable connector having the aforementioned capabilities to be of simple construction and light in weight, yet adequately capable of transmitting loads comparable to those which can be carried by the cable itself.

Further advantages of the connector will be indicated in the following specific description of the representative form of connector illustrated in the drawing.

Figure 1 is a plan view of the connector, showing the parts in locked relationship.

Figure 2 is a side elevation view of the connector with parts approaching the locking position, the wall of the connector being broken away to reveal internal structure.

Figure 3 is a transverse sectional view through the connector on line 3—3 of Figure 2, and Figure 4 is a similar transverse sectional view on line 4—4 of Figure 2.

Figure 5 is a fragmentary sectional view, showing parts in the positions assumed during a cable stress relieving operation, and Figure 6 is a similar view showing the same parts in the positions occupied immediately before and immediately after such stress relieving operation.

The actual connection is effected by mechanical advantage mechanism, such as a quick-acting hook and lever device operating on a conventional principle. Thus one end C of the cable or other tension member is connected to a bifurcated hook 1, the hook elements of which are spaced apart sufficiently to straddle the end 10 of the connector body. To this end is pivoted a lever 11 by a pivot pin 12, which lever is preferably of channel shape to embrace the connector casing. A cross pin 13 interconnecting the sides of the lever is spaced from its pivot pin 12 a distance equal to the spacing between such pivot and a notch 14 in the side of the connector end.

The web of lever 11 is cut out at 15 sufficiently to accommodate the hook 1 which fits between the sides of the lever. The bifurcations of this hook in straddling the end 10 of the connector body, when hooked over pin 13, can be received between the sides of the lever and the respectively adjacent sides of the connector end as the lever is swung from a position away from the body proper 16 of the connector toward such body in the counterclockwise direction, as seen in Fig. 2. As pin 13 moves along an arc centered at pivot 12 it will draw the body 16 of the connector toward hook 1 and the attached cable end C. The lever mechanism thus constitutes connection shortening means and the decrease in the effective cable length thus produced will tend to tension the cable.

The other cable end, or equivalent tension member end, to be joined, designated C', may be connected to a rod 2 in any suitable fashion. This rod projects centrally within the connector body 16, and the end of the rod thus housed is formed with serrations 20. While this rod might be any of various shapes in cross section, it is preferably cylindrical, so that it will not be necessary to provide a rotative joint between such rod and the cable C' in order to enable the cable to rotate relative to the connector. If the rod is cylindrical the serrations preferably are formed as annular alternate ribs and grooves, as distinguished from helical ribs and grooves, although helical threads may be employed if the connector parts have no appreciable tendency to rotate relatively, or are locked against such rotation.

The serrated rod 2, 20 forms one element of a ratchet joint interconnecting the cable C' and the connector body 16. With the rod serrations cooperate latch elements 21 and locking elements 22. The latch elements establish an adjustable connection with the rod, constituting connection lengthening means, whereas the locking elements are engageable with the serrated portion of the rod to prevent further adjustment between it and the connector casing in a direction to lengthen the cable after completion of the connecting operation. A single element might be utilized to perform both such latching and locking functions, but it is preferred that the latch means and the locking means be separate, as illustrated in the drawings.

A plurality of segmental latch elements 21 are employed, four being shown in Fig. 3, which are retained in registry lengthwise of rod 2 by a split spring ring 23 encircling them and fitting in grooves formed in them. The inner surface of each latch element is serrated complementally to the serrations 20 of the rod 2, as shown in Figs. 5 and 6, and ring 23 urges the latch elements radially inward to engage their inner surfaces with the rod serrations. Consequently the latch members are normally held in gripping engagement with the rod.

At the beginning of a coupling operation the connector casing 16 should be located as far as possible to the left in Fig. 2 relative to rod 2. In order to establish the desired tension in the cable, therefore, the connector casing is shifted toward the right relative to the rod by the lever-operated connection shortening mechanism, opposed by the resilience of spring 24 received within the connector casing and encircling the rod, and forming part of the automatic ratcheting connection lengthening mechanism. Such connection shortening and connection lengthening mechanisms are connected in series, so that the final fixed composite length of the connector increases as the difference between the shortening effected by the lever mechanism and the lengthening permitted by the ratchet mechanism decreases.

As the lever 11 is swung in the manner described to connect the hook 1 to the connector body the cable will be tensioned by casing 16 being drawn to the right, as seen in Figure 2. If the pull thus exerted on the casing is sufficiently great it will be shifted lengthwise relative to rod 2. At the beginning of such movement the latch members 21 will be held in gripping engagement with such rod by ring 23. Such relative rod and casing movement will compress spring 24 between the end wall 17 of the casing and a ring 25 which encircles the rod intermediate the spring and the latch members. The end of such ring engaging the latch members has a beveled surface 26 contacting the complementally beveled ends 27 of the latch members. These surfaces are beveled in a direction such that normally the pressure of the spring against the latch members will tend to wedge them into gripping engagement with the serrated section of rod 2.

Normally the latch members 21 cannot escape from gripping engagement with the rod serrations, because, as shown in Fig. 6, until the casing 16 has moved an appreciable distance to the right relative to the rod and the latch members 21, an annular rib 18 formed on the inner surface of the connector casing 16 overlies the latch members, so that they cannot move radially outward sufficiently to clear the serrations. As the connector casing is drawn to the right against the resilience of spring 24 sufficiently far to dispose such casing rib in registry with notches 28 in the latch members, however, such members will be wedged radially outward by the reaction of the force between the serrations 20 and the serrated surfaces of the latch members created by manipulation of lever 11, to release the gripping engagement of the latch members with the rod serrations, as shown in Fig. 5.

The position of the parts shown in Fig. 5 is only transient however; the force of spring 24 acting through inclined surfaces 26 and 27, and the cooperating inclined faces of latch members 21 and casing rib 18, when engaged, as well as ring spring 23, all urge the latch members radially inwardly to reestablish gripping engagement with the rod serrations.

The rod serrations 20 thus ratchet past the latch member serrations, while maintaining the cable tension constant. It is to be noted that regardless of the amount of relative travel between the rod and the casing, the deflection of spring 24, and thus the spring force and the cable tension, remains substantially constant. This is true because the spring must yield only an amount equal to the serration spacing to allow the latch members to move from rod-gripping position to the ratcheting position shown in Fig. 5.

When the lever 11 has been swung in the counterclockwise direction substantially into the position of Fig. 2, the relative contracting movement of hook 1 and connector end 10 has been almost completed. Consequently the latch members will probably have assumed a rod gripping position, such as shown in Fig. 6, and the cables will have been tensioned to their "rigging load," which will be governed by the stiffness of spring 24.

If the cable C, C' is a control cable the tension of its rigging load will be exceeded during its manipulation. If no provision for holding rod 2 relative to casing 16 in addition to that described were made, such control load would again move casing 16 to the right relative to rod 2, so that the latch members 21 would move into the ratcheting position of Fig. 5 to enable the effective length of the cable to be increased further. Upon relief of the control load, therefore, the cable tension would be less than the "rigging load" established initially. Since such action is not desired the locking members 22 are provided. Two such segmental members, as shown in Fig. 4, are recessed to engage opposite sides of the rod 2, and such recesses are serrated complementally to the serrations 20 of the rod.

Normally the locking members are freely movable laterally out of engagement with rod 2, so that they do not resist relative lengthwise movement of the rod and casing 16, although such members are held against movement lengthwise relative to the connector casing by collars 29 and 29' spaced lengthwise of the casing to receive the locking members between them. The lever 11, however, has secured to its inner side, for registry with the locking members 22, a clip 19 having fingers which are inserted through an aperture in the casing 16 into positions between its walls and the locking members, as shown in Fig. 4, when the lever is swung into its position embracing the connector casing. This clip prevents lateral, relative spreading movement of the locking members 22, and consequently positively locks such members and casing 16 against lengthwise movement relative to rod 2.

If the casing 16 moves too far to the right relative to rod 2 during the connecting manipulation of the connector, the unserrated end of such rod at the right, as seen in Fig. 2, will engage between the locking members 22. Closing movement of these members will therefore be limited by engagement with such plain rod portion so that the clip 19 cannot straddle them. The connector arm 11 therefore cannot be moved into securing position, and it will be necessary to lengthen the cable in some way before the cable ends can be joined. The connector thus insures that the cable will not be shortened by coupling the cable ends to a degree that it will be overstressed in operation.

In order to hold the lever 11 in the cable-connecting position in which it embraces connector casing 16 in the manner shown in Fig. 1, fingers 11' projecting lengthwise beyond opposite sides of the swinging end of the lever, and bent slightly toward each other, are received in notches 16' formed in the corresponding end of casing 16.

To secure together cable ends by the use of the connector described it is merely necessary to hook the bifurcated hook 1 over pin 13 of lever 11 when the lever is swung away from the connector casing 16, and then to swing the lever in a counterclockwise direction, as seen in Fig. 2, until it embraces the connector casing and its fingers 11' have snapped into notches 16'. During such swinging of the lever the pin 13 will be moved into notch 14 to hold hook 1 securely relative to the connector casing. Also such casing will be moved to the right from the position shown in Fig. 6 to that shown in Fig. 5, opposed by the resilience of spring 24, to enable the latch members 21 to ratchet until the proper cable tension has been established. Thereafter further adjustment of the rod 2 and casing 16 will be prevented by the locking members 22 being held in the rod gripping position by the clip 19, as shown in Fig. 4.

Conversely, to disconnect the cable ends, it is merely necessary to spring the fingers 11' out of notches 16', and to swing the lever 11 in a clockwise direction, so that the hooks 1 may be disengaged from pin 13. Prior to the next cable connecting operation the rod 2 can be pushed back to the right relative to casing 16, disposing these members in the most contracted position, to insure that enough relative movement of the rod and casing will be available to effect the proper cable tensioning action during the next cable-connecting operation.

While no adjustment for spring 24 is shown, in order to vary the rigging load on the cable established by the connector it will be evident that wall 17 may be moved closer to rib 18, to increase the tension of spring 24 when latch members 21 are in the ratcheting position of Fig. 5. Alternatively, after removing the end wall 17 and disengaging the cable C' from rod 2, a spring 24 of greater or lesser stiffness may be substituted for that shown, for the purpose of increasing or decreasing, respectively, the rigging load which will be established by the connector.

We claim as our invention:

1. A connector comprising a connecting element, resilient tension adjusting means movable slidably in relation to said element over a predetermined range, coupling means operable for connection to said tension adjusting means, and locking means operable to restrain subsequent tension-adjusting movement of said tension adjusting means within said range.

2. A cable connector comprising connection shortening means and connection lengthening means connected in series, each of said means being connected directly to a cable end, said connection shortening means being operable to effect a predetermined positive decrease in the composite effective length of the connector, and said connection lengthening means including resiliently urged ratcheting means interconnecting said shortening and lengthening means and being operable reactively to operation of said shortening means to effect an indeterminate increase in the composite effective length of the connector under a substantially constant lengthening force applied to said resilient means, depending upon the stress desired in the cable.

3. The cable connector defined in claim 2, and means operable to lock the connection lengthening means against movement effecting an increase in the composite effective length of the connector upon completion of movement of the connection shortening means to effect predetermined positive decrease in the composite effective length of the connector.

4. A cable connector comprising connection shortening means and connection lengthening means connected in series, each of said means being connected directly to a cable end, said connection shortening means including a lever swingable to effect a predetermined positive decrease in the composite effective length of the connector, and said connection lengthening means including spring-held ratchet means slidable to effect an indeterminate increase in the composite effective length of the connector depending upon the stress exerted on said ratchet means by swinging of said connection shortening means lever in decreasing the composite effective length of the connector.

5. A cable connector as defined in claim 4, and locking means for the ratchet means of the connection lengthening means, operable by movement of the connection shortening means lever in effecting the predetermined positive decrease in the composite effective length of the connector to lock the ratchet means against subsequent sliding.

6. A cable connector comprising a casing, a connecting element carried by one cable end, coupling means operable to secure said connecting element to said casing, a rod projecting into the end of said casing remote from said coupling means and carried by another cable end, a portion of said rod received within said casing being serrated, a plurality of segmental latch members received within said casing, each having a surface serrated complementally to said rod, holding means operable to hold said latch members with their serrated surfaces in gripping engagement with said rod, and spring means reacting between said casing and said latch members and urging said latch members toward said coupling means, said latch members being movable away from said coupling means upon predetermined compression of said spring means effected by the pull on said casing produced during coupling manipulation of said coupling means, thereby rendering said holding means inoperative, said latching members moving outward to release said rod for ratcheting sliding movement relative to said casing to relieve such spring compression.

7. The cable connector defined in claim 6, and complemental locking segments disposed at opposite sides of the rod and having their adjacent surfaces serrated complementally to the serrations of the rod, and means engageable with said locking segments to retain them in rod gripping position for restraining relative lengthwise movement of the rod and the casing after complete coupling of the coupling means.

8. A cable connector comprising a casing, a connecting element carried by one cable end, a lever pivotally connected to one end of said casing, engageable with said connecting element and swingable relative to said casing to draw toward said casing the cable end carrying said connecting element, a rod projecting into the end of said casing remote from the pivot connection of said lever and carried by another cable end, a portion of said rod received within said casing being serrated, a plurality of segmental latch members received within said casing, each having a surface serrated complementally to said rod, holding means interconnecting said latch members and operable to hold them in cooperating relationship encircling said rod and urging their serrated surfaces into gripping engagement with said rod, and spring means reacting between said casing and said latch members and urging said latch members toward the pivot connection of said lever, said latch members being movable away from the pivot connection of said lever upon predetermined compression of said spring means effected by the pull on said casing produced by swinging said lever relative thereto into a position alongside said casing to draw said connecting element toward said casing, thereby rendering said holding means inoperative to maintain said latch members in gripping engagement with said rod, said latching members moving outward to release said rod for ratcheting sliding movement relative to said casing to relieve such spring compression.

9. The cable connector defined in claim 8, and complemental locking segments disposed at opposite sides of the rod and having their adjacent surfaces serrated complementally to the serrations of the rod, and a clip carried by the lever and engageable between the casing and said locking segments to retain them in rod gripping position for restraining relative lengthwise movement of the rod and the casing after disposition of the lever alongside the casing.

10. The cable connector defined in claim 8, in which the lever is of channel cross section adapted to embrace the casing, such casing having recesses in opposite sides thereof, and the lever having spring fingers projecting lengthwise beyond its swinging end and engageable in such casing recesses to retain the lever in position embracing the casing.

11. A self-adjusting cable connector operable to establish initial tension between cable sections interconnected thereby, comprising a casing, a serrated rod projecting into one end of said casing, a plurality of cooperating segmental elements received within said casing and grouped around said serrated rod, each segmental element having a surface serrated complementally to and engageable with the serrations of said rod, said group of segmental elements being slidable lengthwise of said rod when not in serration-locking engagement therewith, locking means received within said casing and comprising a bearing element normally encircling and constricting the segmental elements of said group into positive serration-locking engagement thereof with the rod, but connected to said casing for unlocking movement therewith lengthwise of said rod in the connector lengthening sense, out of constricting locking engagement with said segmental elements to permit sliding of said segmental elements lengthwise of the rod, spring means received in said casing and reacting axially thereof between said casing and said group of segmental elements in opposition to connector lengthening movement of said casing relative to said rod when engaged by said segmental elements, stop means limiting unlocking movement of said bearing element, hence of said casing, relative to said segmental elements in the connector lengthening sense opposed by said spring means, and opposite stop means limiting locking movement of said bearing element, hence of said casing, in the connector shortening sense relative to said segmental element, effected by said spring means, whereby connecting tension of the connector is established by the force of said spring means independent of the amount of lengthening of said connector to effect the connection.

12. The self-adjusting connector operable to establish initial connecting tension between tension elements interconnected thereby, comprising a casing element, a rod element received concentrically within said casing element for relative lengthwise movement therein, locking means received in said casing element and encircling said rod element, one of said elements having a longitudinally extending locking surface parallel to the rod's axis and engageable by said locking means for locking of such locking means with said locking surface against relative lengthwise movement thereof in any of a plurality of positions along said surface, lock control means cooperating with said locking means and carried by the other of said elements for lengthwise movement therewith relative to said locking means, stop means limiting movement of said lock control means in one direction in locking position relative to said locking means, further stop means limiting opposite, unlocking movement of said lock control means in unlocking position thereof relative to said locking means, corresponding to connector shortening and connector lengthening relative movement between said elements, respectively, and axially directed spring means encircling said rod element and reacting between said locking means and said other of said elements in opposition to connector lengthening movement between said elements, whereby unlocking of said locking means in any position thereof along said locking surface is preceded by connector lengthening unlocking movement of said lock control means, and whereby connecting tension of the connector is established by the force of said spring means independent of the amount of lengthening of said connector to effect the connection.

13. The connector defined in claim 12, wherein the locking means comprises a plurality of segmental elements grouped around the rod, and the rod and the radially inner portions of the segmental elements are complementally serrated for locking engagement between, the lock control means comprises a ring element encircling said segmental elements maintaining the same in serration-locking engagement thereof with the rod in the locking position of said lock control means relative to said segmental elements, and further wherein the stop means comprises abutments spaced axially of the rod and engageable by the ring element in the locking and unlocking positions thereof, respectively.

JOHN A. MORRISON.
RICHARD H. WEILAND.

REFERENCES CITED

The following references are of record in the file of this patent:

UNITED STATES PATENTS

| Number | Name | Date |
|---|---|---|
| 1,692,079 | D'Alo | Nov. 20, 1928 |
| 1,876,443 | Ambrust | Sept. 6, 1932 |
| 1,904,102 | Thompson | Apr. 18, 1933 |
| 2,207,203 | Lundeen | July 9, 1940 |
| 2,298,115 | Felton | Oct. 6, 1942 |
| 2,438,633 | Condor | Mar. 30, 1948 |